Feb. 19, 1935.  R. C. UNDERWOOD  1,992,135
MACHINE FOR MAKING FROZEN CONFECTIONS
Filed July 14, 1930  6 Sheets-Sheet 1

INVENTOR
Robert C. Underwood
BY
Janney, Blair & Curtis
ATTORNEYS

Feb. 19, 1935.   R. C. UNDERWOOD   1,992,135
MACHINE FOR MAKING FROZEN CONFECTIONS
Filed July 14, 1930   6 Sheets-Sheet 2
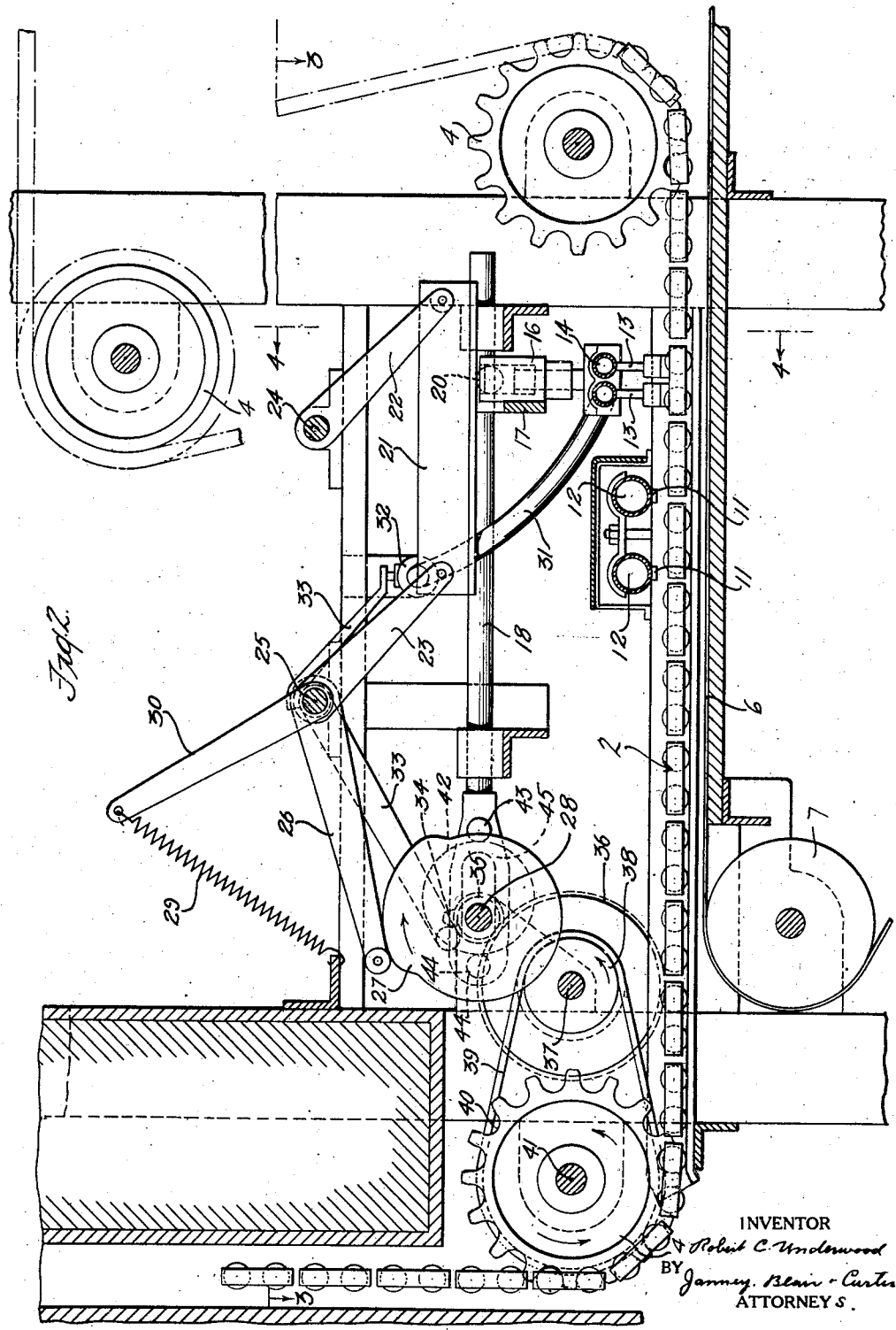

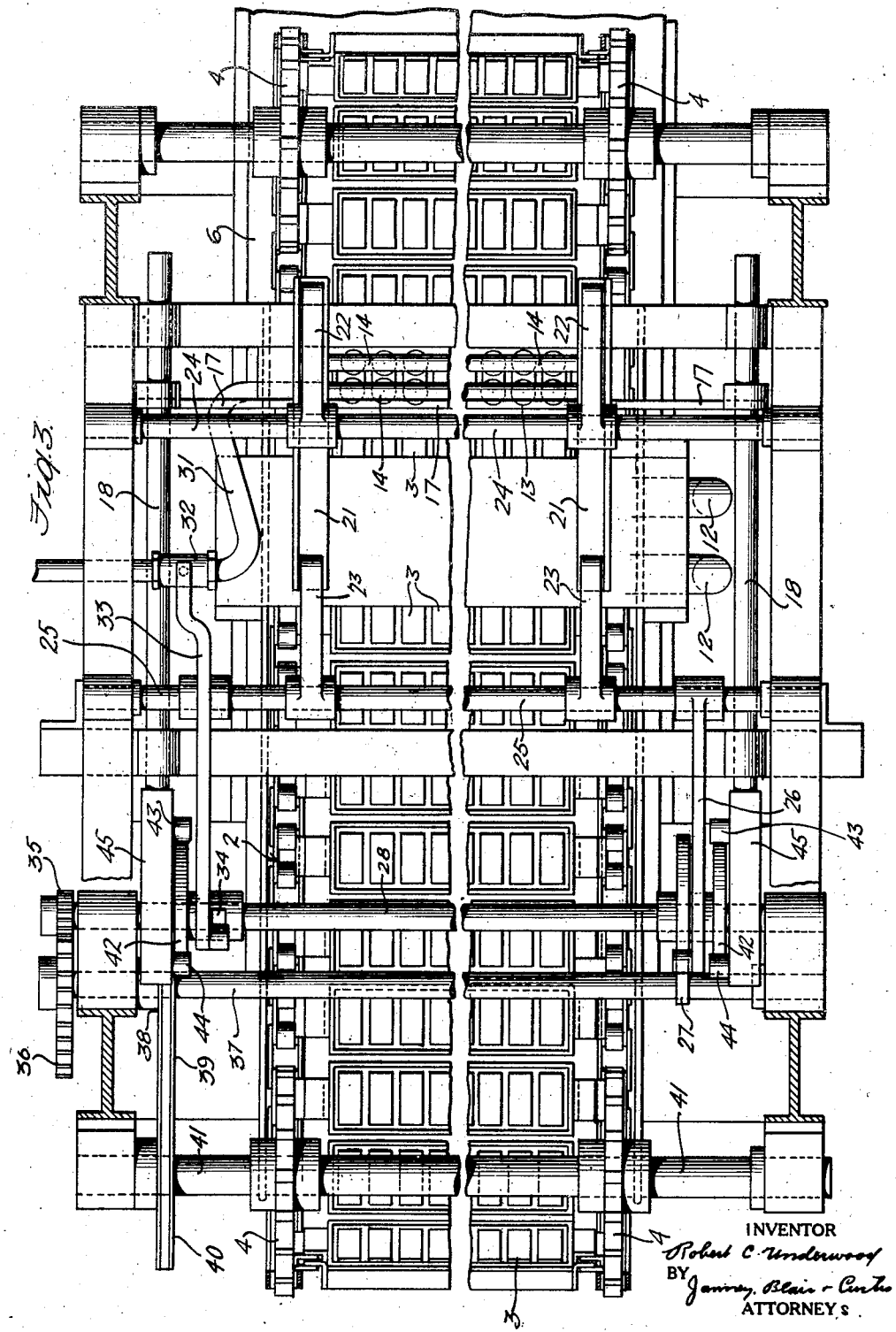

Feb. 19, 1935.   R. C. UNDERWOOD   1,992,135
MACHINE FOR MAKING FROZEN CONFECTIONS
Filed July 14, 1930   6 Sheets-Sheet 4
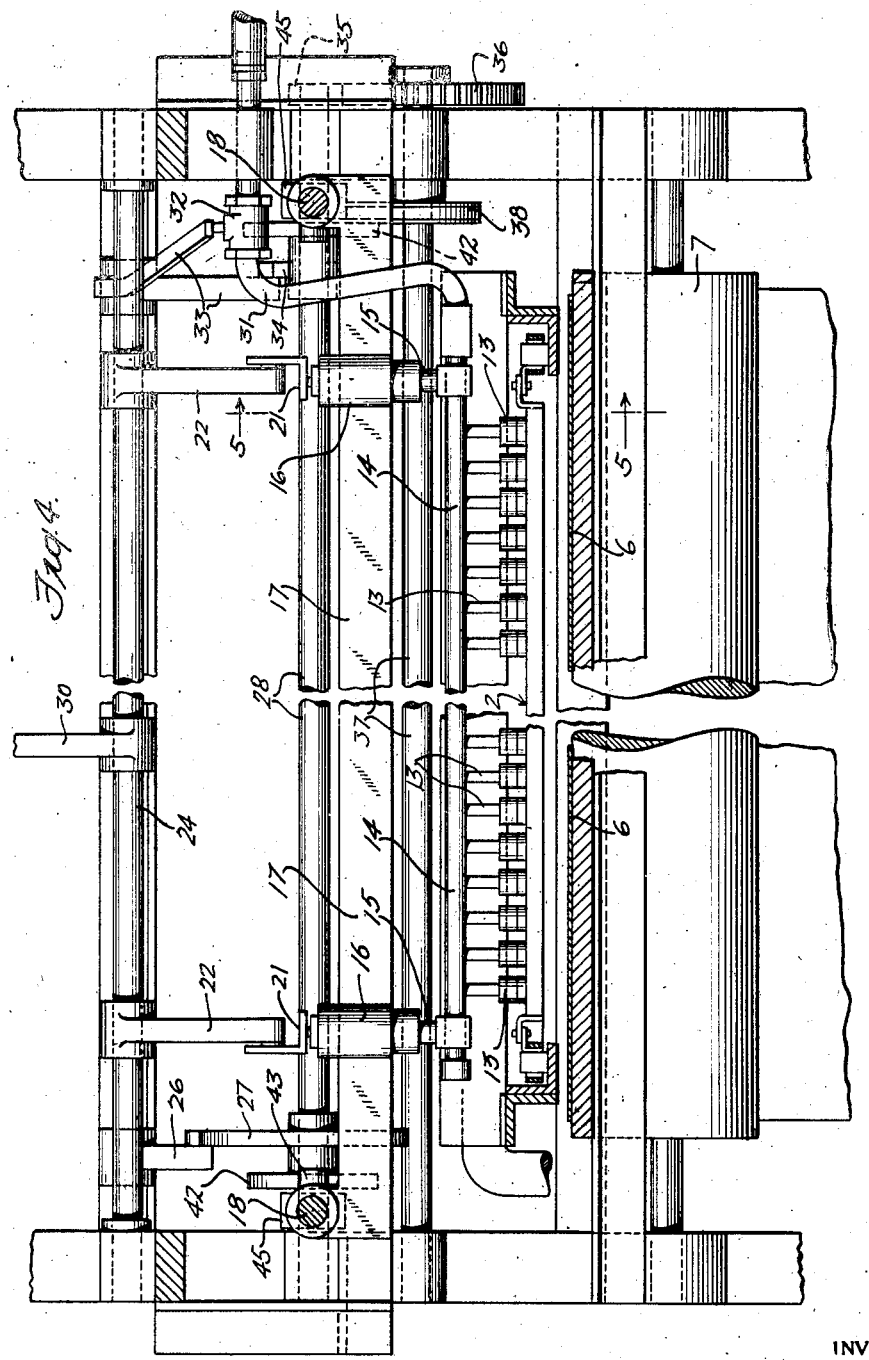
INVENTOR
Robert C. Underwood
BY
Janney Blair + Curtis
ATTORNEY

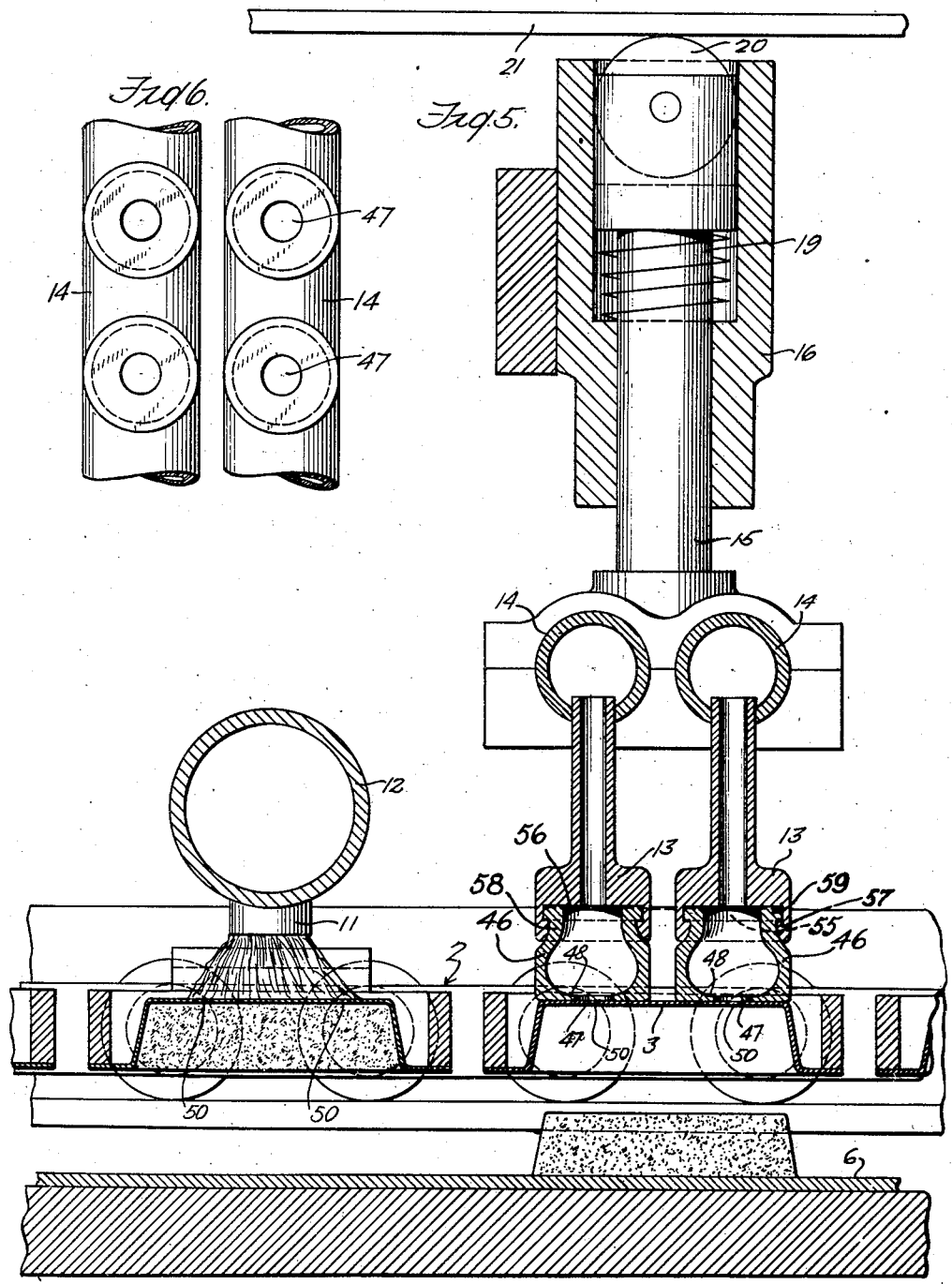

Feb. 19, 1935. R. C. UNDERWOOD 1,992,135
MACHINE FOR MAKING FROZEN CONFECTIONS
Filed July 14, 1930 6 Sheets-Sheet 6
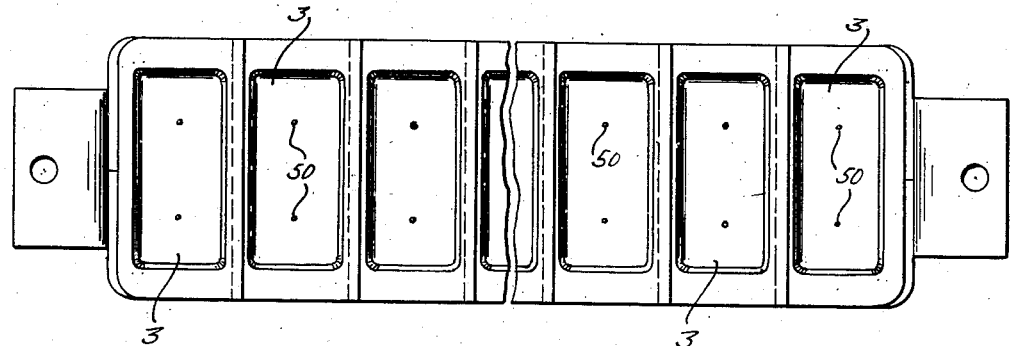
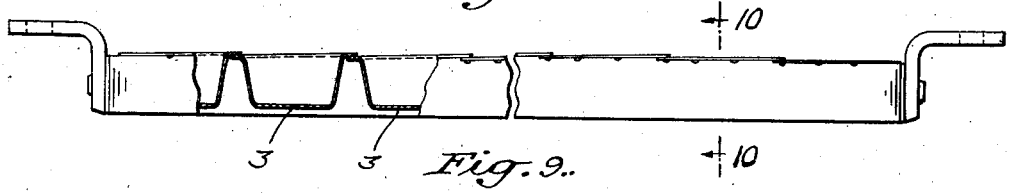
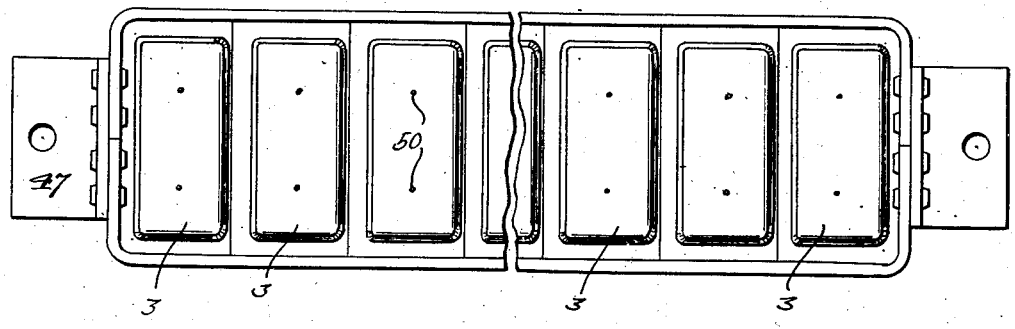
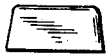
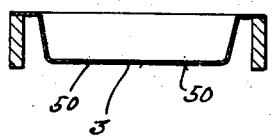
INVENTOR
BY Robert C. Underwood
Janney, Blair & Curtis
ATTORNEYS

UNITED STATES PATENT OFFICE 1,992,135

MACHINE FOR MAKING FROZEN CONFECTIONS

Robert C. Underwood, Brooklyn, N. Y., assignor to New York Eskimo Pie Corporation, Brooklyn, N. Y., a corporation of New York Application July 14, 1930, Serial No. 467,711

6 Claims. (Cl. 107—8)

This invention relates to apparatus for the production of frozen confections.

In the production of frozen confections such as chocolate coated ice cream cakes or other similar confections it has been the practice to freeze the confection in small molds of the required size and shape for a single cake and eject the cakes on to a conveyor for transportation to the coating machine. Difficulty has been encountered in ejecting the frozen cakes from the molds onto the conveyor.

It is an object of this invention to provide an efficient means for automatically ejecting the frozen confections from the molds in which such confections are frozen onto a belt conveyor for transportation to a coating mechanism.

Other objects will be in part obvious and in part pointed out hereinafter.

Accordingly the invention consists in the features of construction, combinations of elements, and arrangements of parts which will be exemplified in the structure hereinafter described and the scope of the application of which will be indicated in the sub-joined claims.

In the drawings:—

Fig. 2 is an enlarged side elevation partly in section of the confection ejecting mechanism.

Fig. 3 is a sectional view taken on the line 3—3 of Fig. 2.

Fig. 4 is a sectional view taken on the line 4—4 of Fig. 2.

Fig. 5 is an enlarged sectional view taken on the line 5—5 of Fig. 4, and showing the flame heater and air blowers for ejecting the frozen cream from the molds.

Fig. 6 is a detailed bottom plan view of the air blowers.

Fig. 7 is an enlarged top plan view of one of the multi-molds in which the confections are frozen.

Fig. 8 is a side elevation of the same partly in section.

Fig. 9 is a bottom plan view of the same.

Fig. 10 is a sectional view taken on the line 10—10 of Fig. 8.

Figs. 11, 12 and 13 are bottom, end and side views respectively of one of the frozen confections after it has been ejected from a mold.

Figure 1:
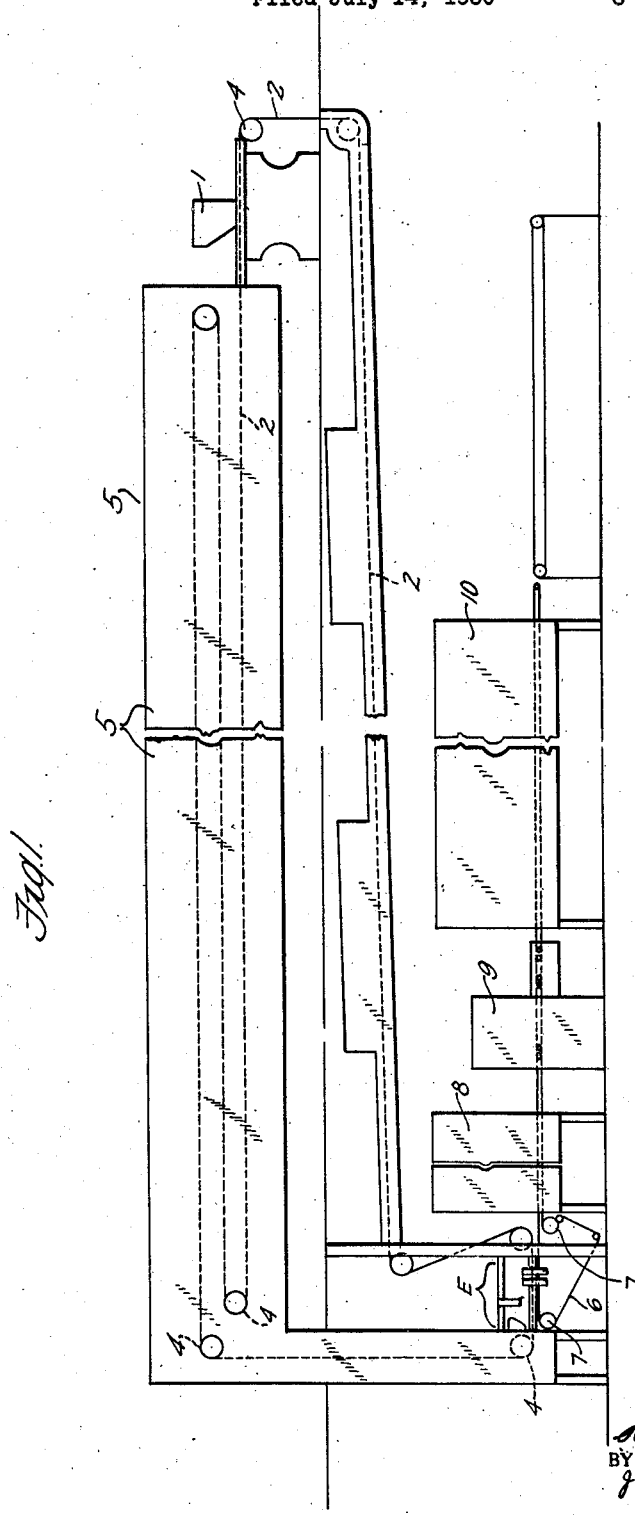
Figure 1 is a diagrammatic view of apparatus embodying the invention for making frozen confections.

In Fig. 1 is shown diagrammatically a complete machine for freezing and coating ice cream cakes. Referring to the upper right hand corner of the machine a hopper 1 is provided to receive the cream to be frozen and coated. Passing beneath hopper 1 is an endless conveyor 2 which carries molds 3 (see Fig. 7) to receive cream dropped from hopper 1. Conveyor 2 which passes over sprocket wheels 4, carries the cream first through a cooling chamber 5 where the cream is frozen hard in the molds 3, and thence to the ejecting and separating mechanism indicated generally at E in Fig. 1. The ejecting mechanism removes the frozen cakes from the molds 3 and deposits them on to an endless belt 6 which passes over rollers 7 and carries the cakes through a second cooling chamber 8 and to other belts which convey the cakes through a chocolate enrobing compartment 9, another cooling room 10, and to wrapping machines, not shown. Sprocket wheels 4 and rollers 7 are driven from any suitable source of power.

Referring to Fig. 2, as the conveyor 2 and molds 3 leave the hardening room 5 they pass around a sprocket wheel 4 and then horizontally beneath the ejecting means presently to be described. Passage of the molds around sprocket wheel 4 inverts the molds so that the frozen cakes may be ejected downwardly on the belt conveyor 6 located directly beneath conveyor 2. Even when inverted the frozen cakes adhere firmly to the sides of the molds 3. For loosening the cakes in the molds a heater is positioned in close proximity to the inverted molds to apply heat thereto as they pass beneath the heater. As best shown in Figs. 2 and 5, the heater consists of a plurality of flame-emitting burners 11, preferably gas burners, which spray the flames directly on the bottoms and sides of the molds 3 as they pass beneath the burners. The flame heat thus applied melts the outer surfaces of the frozen confection sufficiently to loosen it in the mold. Gas for the burners 11 may be supplied through pipes 12.

Continued movement of the conveyor 2 past the burners 11 brings the inverted molds beneath compressed air blowers 13 which blow air through small holes 50 (see Fig. 7) provided in the bottom of the molds and eject the cakes downwardly onto the belt 6. Compressed air for the blowers 13 may be supplied through pipes 14. Blowers 13 are given a four-motion movement to engage and travel with each mold as it reaches the plane of the blowers.

As best shown in Figs. 4 and 5, blowers 13 are connected to the pipes 14 which are supported on either side of the machine by a plunger 15 vertically reciprocable in a housing 16 which is carried by a cross bar 17 secured at either side of the machine to shafts 18 reciprocable horizontally in bearings secured to the framework of the machine. Surrounding each of the plungers 15 is a spring 19 to normally maintain the blowers 13 in raised position above the molds. As shown in Fig. 2, the upper extremity of each plunger 15 is provided with a roller 20 adapted to contact with the under side of a swinging plate 21 pivotally supported at one end by a swinging arm 22 and at the other end by an arm 23 fast on a shaft 25 journaled in the framework of the machine. Arm 22 is pivoted to a shaft 24 carried by the framework of the machine. For rocking shaft 25 an arm 26 fast on said shaft contacts with a cam 27 carried by a shaft 28 journaled in the side frames of the machine. Contact between cam 27 and arm 26 is maintained by a spring 29 and an extension arm 30 also fast on shaft 25. The arrangement is such that the raising of arm 26 by cam 27 causes plate 21 to swing downwardly and force blowers 13 down on to the bottoms of molds 3; the nozzles of the blowers being so positioned as to drop over the holes 50 provided in the bottom of each mold. As the blowers engage the molds, compressed air is forced through the blowers from a flexible pipe or hose 31; a valve 32 being provided to control the passage of the air into the pipe 31. Valve 32 is controlled through a bell crank arm 33 pivoted on shaft 25 and operated by a cam 34 on shaft 28. Shaft 28 is rotated through a gear 35 on shaft 28, a gear 36 on a shaft 37, a sprocket 38 on shaft 37, and a sprocket chain 39 connecting sprocket 38 and a sprocket 40 on sprocket shaft 41.

Shafts 18 are reciprocated horizontally to move blowers 13 with the molds and return them for the next operation by means of an eccentric 42 mounted on shaft 28 and contacting with rollers 43 and 44 carried by a fork 45 secured to the shaft 18.

Referring to Fig. 5, each mold 3 is preferably formed with sides and ends which taper outwardly from the bottom so as to facilitate the ejection of the frozen cream from the mold. The holes 50 provided in the bottom of the mold are preferably small enough to prevent the semi-plastic or partially frozen confection from passing through the holes to an appreciable extent, while large enough to permit a blast of compressed air to blow the frozen confection from the mold. As best shown in Figs. 7 to 10 inclusive, a plurality of individual molds are formed integrally with proper spaces between adjacent molds, and the multiple mold thus formed is secured to and carried by the conveyor 2.

Referring again to Fig. 5, to prevent the escape of air from the blowers 13 and to insure a full blast passing through the openings 50 in the mold, each blower 13 is provided with a flexible nozzle 46, preferably of rubber, to contact firmly with the bottom of the mold. Each nozzle 46 is provided with an opening 47 in the bottom wall through which the air is blown into the opening 50 in the mold. The side walls of the nozzle are comparatively thick to resist expansion under the air pressure, while that part of the bottom wall (designated 48 in Fig. 5) which surrounds the opening 47 is comparatively thin and flexible so that the pressure of the air thereagainst will force the same into firm contact with the bottom wall of the mold surrounding the hole 50. The thin flexible portions 48 constitute, in effect, an inwardly projecting flange against which the air presses and which is forced by the air into tight contact with the mold surrounding a hole 50. As increased air pressure tightens the contact between the nozzle and the mold, sufficient pressure may be employed to effectively eject the frozen confection from the mold. By reference to Fig. 5 it will be seen that each of the conduits 13 is provided with a socket 55 formed at its lower end by enlarging the conduit at the lower end and extending the side walls of the enlargement sufficiently to provide said socket 55 with an interior base wall 56. An inturned flange 57 is formed adjacent the bottom of the socket and a space provided between the said base wall 56 and the flange. The resilient rubber nozzle is reduced in diameter at its upper end as indicated at 58, and at its upper end the reduced portion extends outwardly in the form of an annular flange 59 which is adapted when the conduit and nozzle are united to overlie the flange 57 of the conduit and substantially fill the space between said flange and the base wall of the socket. Such a construction facilitates the replacement of nozzles as it is an easy matter to pinch together the resilient walls of the nozzle and force the upper flange thereof through the opening in the socket of the conduit. When the nozzle is permitted to return to its normal shape the parts will assume the position shown in the drawings. This construction has another marked advantage in that the pressure of the air within the nozzle tends to force the coacting portions of nozzle and conduit more securely together, thus positively preventing the escape of air around the upper end of the nozzle.

In operation the conveyor 2 with the inverted molds 3 is moved at substantially a uniform speed beneath the burners 11 which loosen the frozen cakes in the molds. The air nozzles 46 then descend and move with the molds while blowing the frozen cakes from the molds onto the belt 6 which conveys the cakes through the chocolate enrobing compartment.

It will be seen that there is provided a construction of an essentially practical nature in which the several objects of the invention are attained.

As many possible embodiments may be made of the invention, and as many changes might be made in the embodiment above set forth, it is to be understood that all matter hereinbefore set forth or shown in the accompanying drawings is to be interpreted as illustrative and not in a limiting sense.

I claim:
1. In a machine for use in making frozen confections, the combination of an endless conveyor; a plurality of molds carried thereby, each mold having outwardly tapering side walls and being provided with a plurality of holes in the bottom wall; a plurality of compressed air blowers for ejecting the frozen confections from the molds, each blower being provided with a rubber nozzle having an inwardly projecting flange adapted to surround the hole in the mold and be forced by the air pressure into firm contact with the bottom of the mold; and means to present the molds to the action of the blowers.

2. In a machine for use in making confections, the combination of an endless conveyor, a plurality of molds carried thereby, each mold having outwardly tapering side walls and being provided with a hole in the bottom wall; a compressed air blower for ejecting confections from the molds, each blower being provided with a nozzle having an inwardly projecting flexible flange adapted to surround the hole in the mold and to be forced by the air pressure into firm contact with the bottom of the mold; and means to present the molds to the action of the blower.

3. In a machine for use in making confections, the combination of an endless conveyor; a plurality of molds carried thereby, each mold being provided with a hole in the bottom wall; a compressed air blower for ejecting the confections from the molds, said blower being provided with a nozzle having an inwardly projecting flexible flange adapted to surround the hole in the molds and to be forced by the air pressure into firm contact with the bottom of the mold; and means to present the molds to the action of the blower.

4. In a machine for use in making confections, the combination of an endless conveyor, a plurality of molds carried thereby, each provided with a hole in the bottom wall; and a compressed air blower for ejecting confections from the molds, said blower being provided with a nozzle having an inwardly projecting flexible flange adapted to surround the hole in the mold and to be forced by the air pressure into firm contact with the bottom of the mold.

5. A nozzle for directing compressed air through an aperture in a mold to eject the contents of the mold therefrom, comprising integral side walls forming an opening at the top of the nozzle to receive air from a compressed air conduit and an opening at the bottom of the nozzle to register with the aperture in the mold, and a flexible flange formed integrally with the side walls and extending inwardly toward the aperture a substantial distance to provide a plane surface to contact with the mold around the aperture and a surface exposed to the pressure of the air in the nozzle, whereby the pressure of the air in the nozzle acting on the upper surface of the flange will force the flange into firm contact with the mold and seal the joint therebetween.

6. In a machine for ejecting confections from molds having apertures in their bottoms, the combination of a conduit for conducting compressed air from a source of supply, and a resilient nozzle secured to the end of said conduit and adapted to contact with the bottom of the mold around an aperture, said nozzle having relatively thick side walls to resist outward flexure under the influence of the compressed air, and the bottom of the nozzle being provided with a relatively thin flexible flange extending inwardly toward the aperture a substantial distance to provide an annular plane surface adapted to contact with the bottom of the mold around the aperture and a surface exposed to the pressure of the compressed air in the nozzle, said relatively thin flexible flange being adapted under the influence of the pressure of the air in the nozzle to seal the contact between the nozzle and the bottom of the mold.

ROBERT C. UNDERWOOD.